United States Patent
Benes et al.

(10) Patent No.: US 8,834,243 B2
(45) Date of Patent: *Sep. 16, 2014

(54) SUPPORT ASSEMBLY FOR MOVEABLE MEMBERS OF AN AGRICULTURAL COMBINE AND DEVICES THEREOF

(75) Inventors: Jason M. Benes, Mount Joy, PA (US); Daniel E. Reinhart, Reinholds, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/407,903

(22) Filed: Feb. 29, 2012

(65) Prior Publication Data
US 2012/0172097 A1    Jul. 5, 2012

Related U.S. Application Data

(62) Division of application No. 12/549,554, filed on Aug. 28, 2009, now Pat. No. 8,152,609.

(51) Int. Cl.
*A01F 12/44* (2006.01)
*B07B 1/50* (2006.01)
*A01D 41/12* (2006.01)

(52) U.S. Cl.
CPC .................................. *A01D 41/1243* (2013.01)
USPC ............................................. 460/97; 460/94

(58) Field of Classification Search
USPC .................. 460/94, 95, 97, 111, 112, 101
See application file for complete search history.

(56) References Cited

U.S. PATENT DOCUMENTS

| | | | |
|---|---|---|---|
| 1,342,806 A * | 6/1920 | Gross .............................. | 460/76 |
| 2,064,751 A | 12/1936 | Hussman | |
| RE22,280 E | 3/1943 | Lord | |
| 2,500,448 A | 3/1950 | Bozarth | |
| 2,993,530 A | 7/1961 | Little et al. | |
| 3,322,377 A | 5/1967 | Morton | |
| 3,927,854 A | 12/1975 | Carey | |
| 4,371,580 A | 2/1983 | Morrison et al. | |
| 4,607,492 A | 8/1986 | Demus et al. | |
| 4,614,197 A * | 9/1986 | Weber et al. .................. | 460/112 |
| 5,169,110 A | 12/1992 | Snaith et al. | |
| 5,217,198 A | 6/1993 | Samarov et al. | |
| 5,273,488 A * | 12/1993 | Hollevoet ...................... | 460/106 |
| 5,275,371 A | 1/1994 | Brian et al. | |
| 5,338,257 A | 8/1994 | Underwood | |
| 5,358,210 A | 10/1994 | Simon et al. | |
| 5,374,012 A | 12/1994 | Marchand et al. | |
| 6,554,701 B1 | 4/2003 | Wolters | |
| 6,582,298 B2 | 6/2003 | Wolters | |
| 6,695,296 B1 | 2/2004 | Runge | |
| 8,152,609 B2 * | 4/2012 | Benes et al. ................... | 460/111 |
| 2007/0256402 A1 * | 11/2007 | McCane et al. ................ | 56/10.8 |

OTHER PUBLICATIONS

Prairie Belting, Inc. brochure, 44 pages, undated, available at www.prairiebelting.com/agbelting.pdf.

* cited by examiner

*Primary Examiner* — Alicia Torres
(74) *Attorney, Agent, or Firm* — Patrick M. Sheldrake; Seyed V. Sharifi T.

(57) ABSTRACT

A support assembly for supporting a moveable member of an agricultural combine is provided. The support assembly includes a moveable member, such as a foldable chaff pan assembly for spreading chaff and other crop residue from the rear of an agricultural combine, a support member and a resilient member connected to the support member for supporting the moveable member. The resilient member can be configured as an arched shaped or cylindrically shaped member.

17 Claims, 12 Drawing Sheets

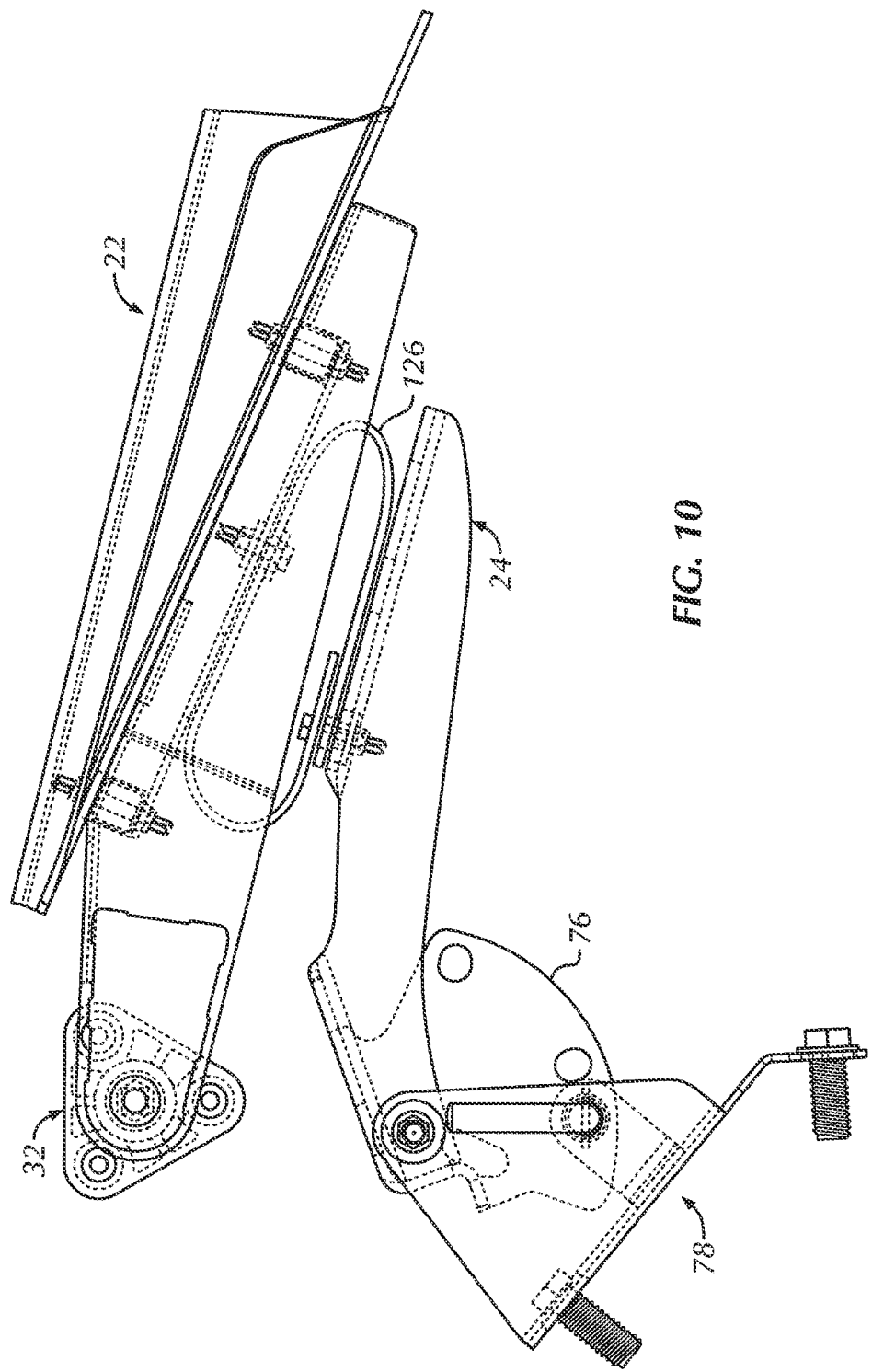

SUPPORT ASSEMBLY FOR MOVEABLE MEMBERS OF AN AGRICULTURAL COMBINE AND DEVICES THEREOF

This divisional application claims priority under 35 U.S.C. §120 from U.S. patent application Ser. No. 12/549,554 filed on Aug. 28, 2009 now U.S. Pat. No. 8,152,609 by Jason M. Benes, et al. with the same title, the full disclosure of which is hereby incorporated by reference.

BACKGROUND OF THE INVENTION

The present invention relates generally to agricultural combines, and more particularly, to a support assembly for moveable members of a combine, such as a foldable chaff pan assembly. With respect to a foldable chaff pan assembly, the foldable chaff pan assembly is positioned rearwardly of the cleaning apparatus of an agricultural combine for conveying chaff from the cleaning apparatus to a chopper and/or spreader, the foldable chaff pan assembly is connected to the cleaning apparatus for oscillation therewith, and being foldable between a deployed position for conveying the chaff and a retracted position for allowing access to the cleaning apparatus and the chopper and spreader for ease of maintenance, service and inspection thereof.

Currently, combines typically include a straw chopper and/or straw spreader for disposing of straw separated from the harvested crop onto the crop field. Combines also typically have a chaff spreader for spreading the chaff separated from the grain by the cleaning apparatus or system. Chaff is typically carried rearwardly by a flow of air blown upwardly through the cleaning apparatus, and to enclose this space to contain the chaff containing air flow and direct it to the chopper and/or spreader, a pan or other enclosure can be used. It is known to mount such pans to the frame or other enclosures of the combine, or to the cleaning apparatus itself, and for the pan or enclosure to be foldable between an operational position and an open position. However, pans or enclosures attached to the combine frame but not to the cleaning apparatus have the disadvantage that they do not provide a continuous path from the cleaning apparatus to the chopper and/or spreader and do not vibrate or oscillate with the cleaning apparatus. Pans attached to the cleaning apparatus will oscillate therewith, but if supported only by the cleaning apparatus place loads thereon which can degrade the operation thereof. Thus, what is sought is a support assembly for supporting such a pan for conveying chaff to a chopper and/or spreader located behind the cleaning apparatus of a combine, that is attachable to the cleaning apparatus for vibration or oscillation therewith, but without unduly loading it, and which is easily and conveniently repositionable or movable for allowing access to the cleaning apparatus and the chopper and/or spreader.

Additionally, some combines have cleaning apparatus which are self-leveling, that is, they pivot or tilt at least sidewardly to compensate for tilting of the combine as it moves across the sides of hills and the like. Thus, it is also sought that a pan for bridging the space between the cleaning apparatus and the chopper and/or spreader be able to pivot or tilt (roll) with the cleaning apparatus.

However, conventional chaff pan designs 1000 operate in a sliding and rolling manner to effectuate fore and aft oscillation or left and right rotation of the chaff pan, as shown in FIG. 1. That is, conventional chaff pan assemblies 1000 include a pipe 1002 and rollers 1004 for supporting and sliding the chaff pan support 1006. The pipe 1002 and rollers 1004 provide for a sliding and rolling means while the chaff pan support 1006 is oscillated, typically about 270 revolutions per minute (RPM). Such pipe and roller configurations, while adequate, are susceptible to wear especially in non-clean or debris environments, which is typically the case for combine operations. As a result, conventional chaff pan support systems wear prematurely resulting in e.g., mission disabling wear of the pipe 1002, added expense, downtime and maintenance requirements for the combine.

Accordingly, a need exists for a support assembly, such as a chaff pan support that can oscillate in the fore and aft direction, and generally rotate/move in six degrees of freedom, function in a drop down position, and operate with improved reliability and resistance to wear.

BRIEF SUMMARY OF THE INVENTION

In accordance with a preferred embodiment, the present invention provides a support assembly for supporting a moveable member of an agricultural combine comprising: a moveable member operatively connected to the combine and moveable relative to the combine, the moveable member having a lower portion; a support member connected to the combine, the support member having an upper portion; and a pliable resilient member having a first end connected to the upper portion of the support member and a second end connected to the lower portion of the moveable member, the pliable resilient member configured to allow movement of the moveable member relative to the support member in six degrees of freedom and to support the moveable member in a spaced apart relation to the support member.

In accordance with another preferred embodiment, the present invention provides a foldable chaff pan assembly for attachment to an oscillating element of an agricultural combine for oscillation therewith, comprising: a pan assembly that includes: a chaff pan having a surface for receiving chaff positionable in a first position adjacent to the oscillating element for receiving the chaff therefrom, and a pivoting element for connecting the pan assembly to the oscillating element for oscillation therewith and pivotal movement relative thereto about a generally horizontal axis between the first position and a second position angularly related to and beneath the first position; and support assembly pivotably connected to the combine for supporting the pan assembly in the first position and the second position; and a resilient member having a first end connected to an upper portion of the support assembly and a second end connected to a lower portion of the pan assembly to allow movement of the pan assembly relative to the support assembly.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 10 is a side, elevational view of the foldable chaff pan assembly of FIG. 2 with a cylindrically shaped resilient member in accordance with another preferred embodiment of the present invention;

DETAILED DESCRIPTION OF THE INVENTION

Figure 2:
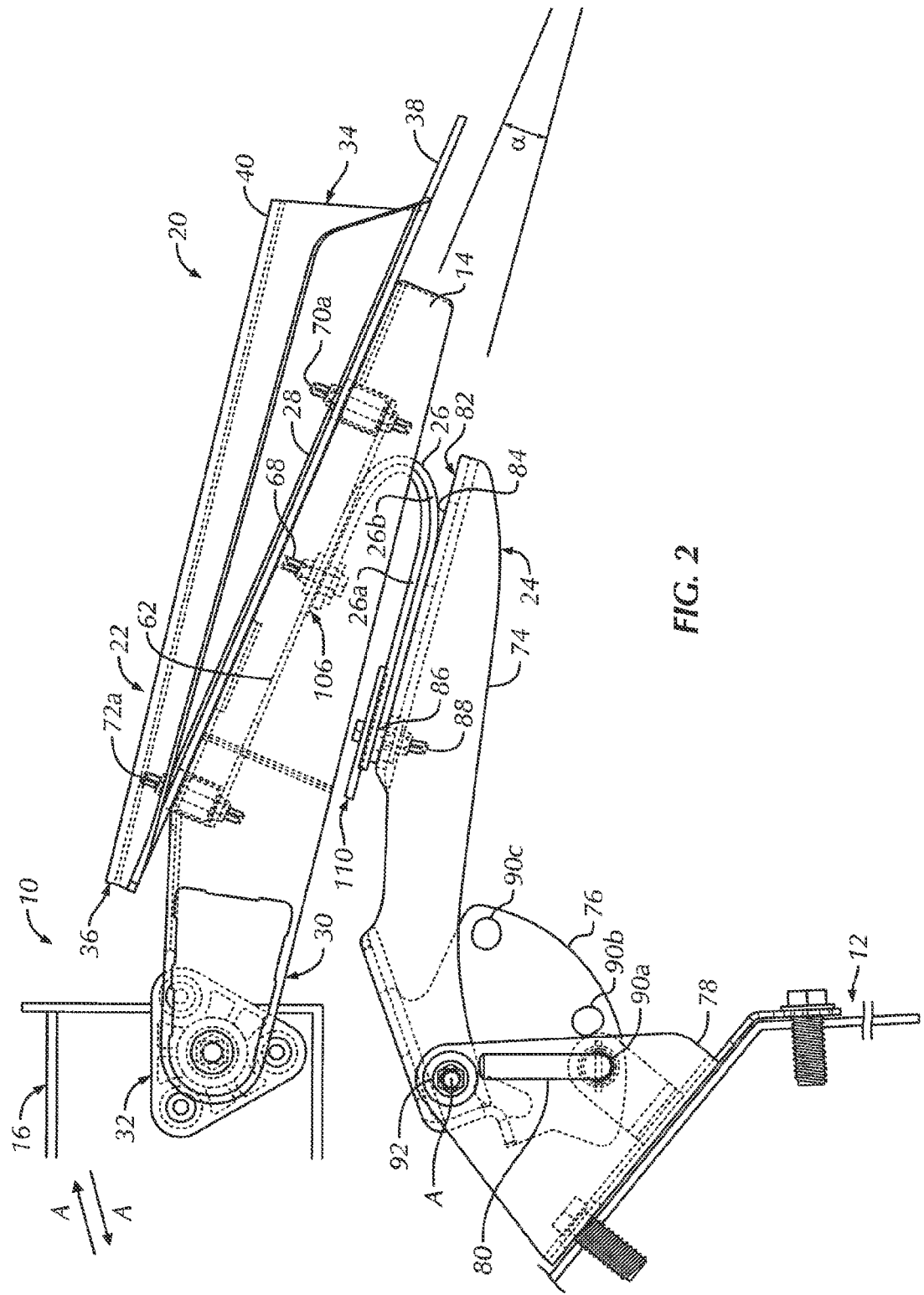
FIG. 2 is a side, elevational view of a foldable chaff pan assembly in accordance with a preferred embodiment of the present invention.

Referring now to the drawings, wherein preferred embodiments of the present invention are shown, in FIG. 2, a rear end 10 of an agricultural combine 12 is shown, including a foldable chaff pan assembly 14 for disposing of and spreading straw, stalks, and other crop residue and trash that has been separated from the grain of the crops by a threshing mechanism (not shown) of combine 12, located forwardly of rear end 10. Crop residue is propelled rearwardly by rotating beaters or the like (not shown) from the threshing mechanism through an exhaust duct to a rotary device for chopping and/or spreading thereby. After separation from the straw, stalks, and other residue and trash, the grain is then separated from chaff by cleaning apparatus 16 that includes at least one generally horizontal chaffer or sieve (not shown) supported on front-to-rear extending chaffer rails (not shown) located on opposite sides of the chaffer or sieve. The chaffer or sieve includes apertures therethrough adjustable in size for allowing passage of grains of a selected maximum size therethrough, while preventing the larger chaff from passing therethrough, for separating the grain from the chaff in the well known manner. Cleaning apparatus 16 is oscillated in one or more generally horizontal directions, as denoted by arrows A, by an oscillating apparatus (not shown) to facilitate the separation of the grain from the chaff, also in the well known conventional manner. The cleaning apparatus 16 is supported for oscillating movement by the combine 12 and typically oscillates at about 270 RPM. As such, the cleaning apparatus 16 i.e., an oscillating element, thereby provides oscillating movement to the foldable chaff pan assembly connected thereto. The structure, operation and function of such cleaning apparatuses are well known in the art and a detailed description of them is not necessary for a complete understanding of the present invention. The cleaning apparatus 16 can also be configured to tilt (roll) at an angle relative to the horizontal so as to maintain the working of the chaff pan in a substantially horizontal position, such as while the combine 12 is moving along a hillside or the like.

Figure 3:
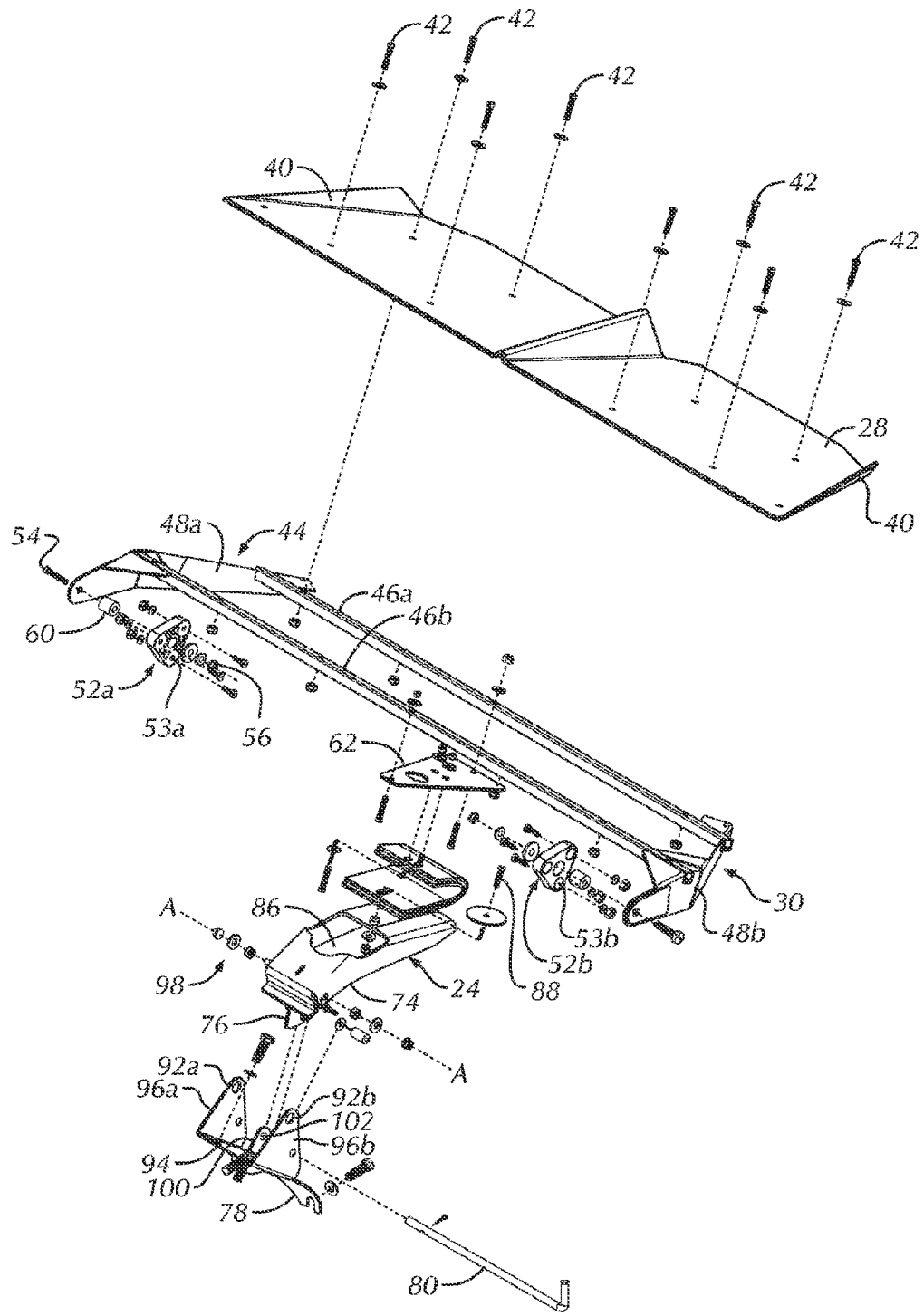
FIG. 3 is an exploded, top, perspective view of the foldable chaff pan assembly of FIG. 2.

The foldable chaff pan assembly 20 includes a pan assembly 22, a support assembly 24, and a resilient member 26. The pan assembly 22 includes a chaff pan 28, a chaff pan support 30 and a pivoting assembly 32. The chaff pan 28 includes a rear end 34 for the discharging of chaff and a front end 36 for receiving chaff from the cleaning apparatus 16. The chaff pan 28 is configured to have a generally planar surface 38 and chaff guides 40 about the chaff pan's lateral sides (FIG. 3). The chaff pan 38 can be fastened to the chaff pan support 30 by fasteners 42, such as, but not limited to, nut and bolt fasteners.

The chaff pan support 30 is generally configured as shown in FIG. 3 and includes a chassis 44. The chassis 44 is preferably formed from two transverse support bars 46a, 46b connected to frame ends 48a, 48b. The transverse support bars 46a, 46b also serve as the securing members about which the fasteners 42 are fastened to.

Figure 4:
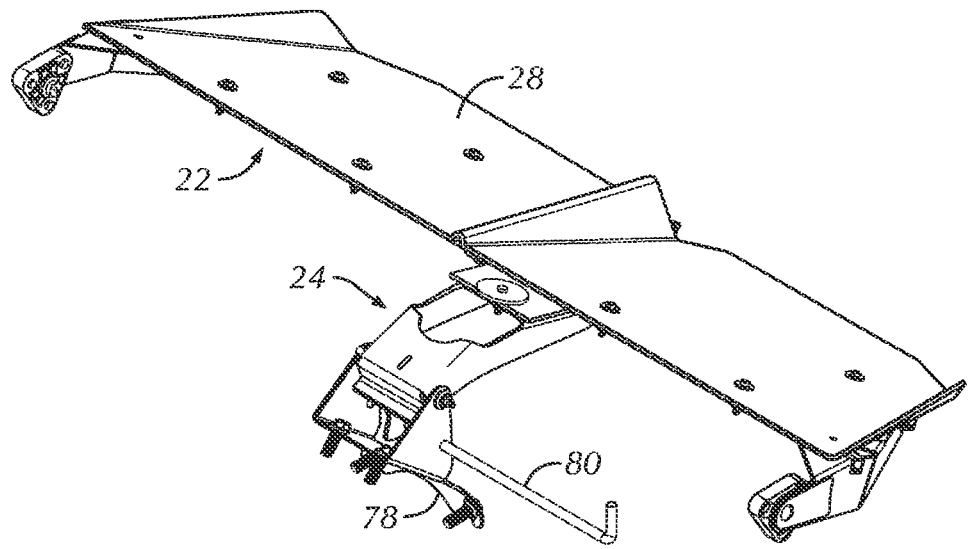
FIG. 4 is an assembled, top, perspective view of the foldable chaff pan assembly of FIG. 3.
Figure 5:
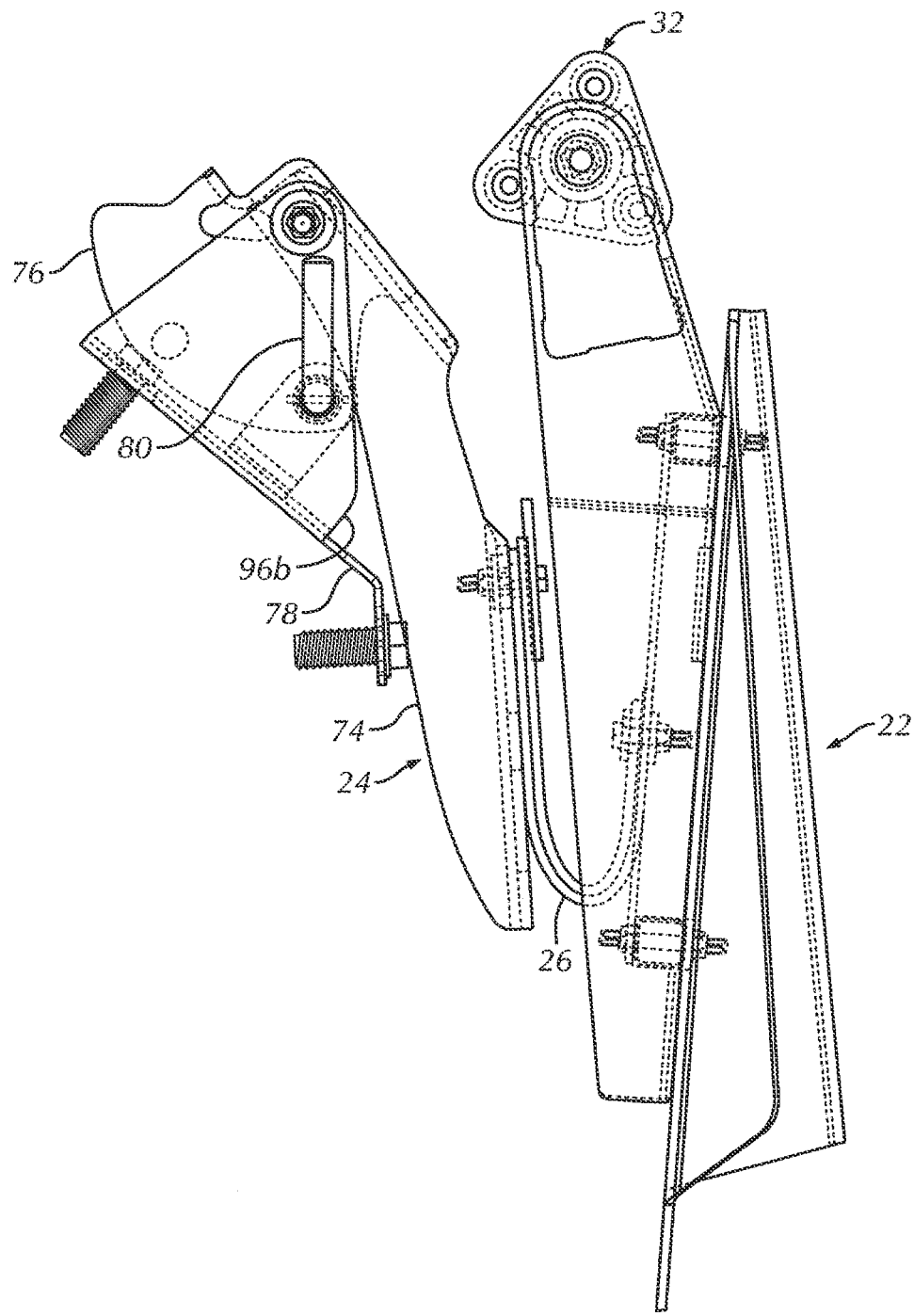
FIG. 5 is a side, elevational view of the foldable chaff pan assembly FIG. 2 in a drop down position.
Figure 7:
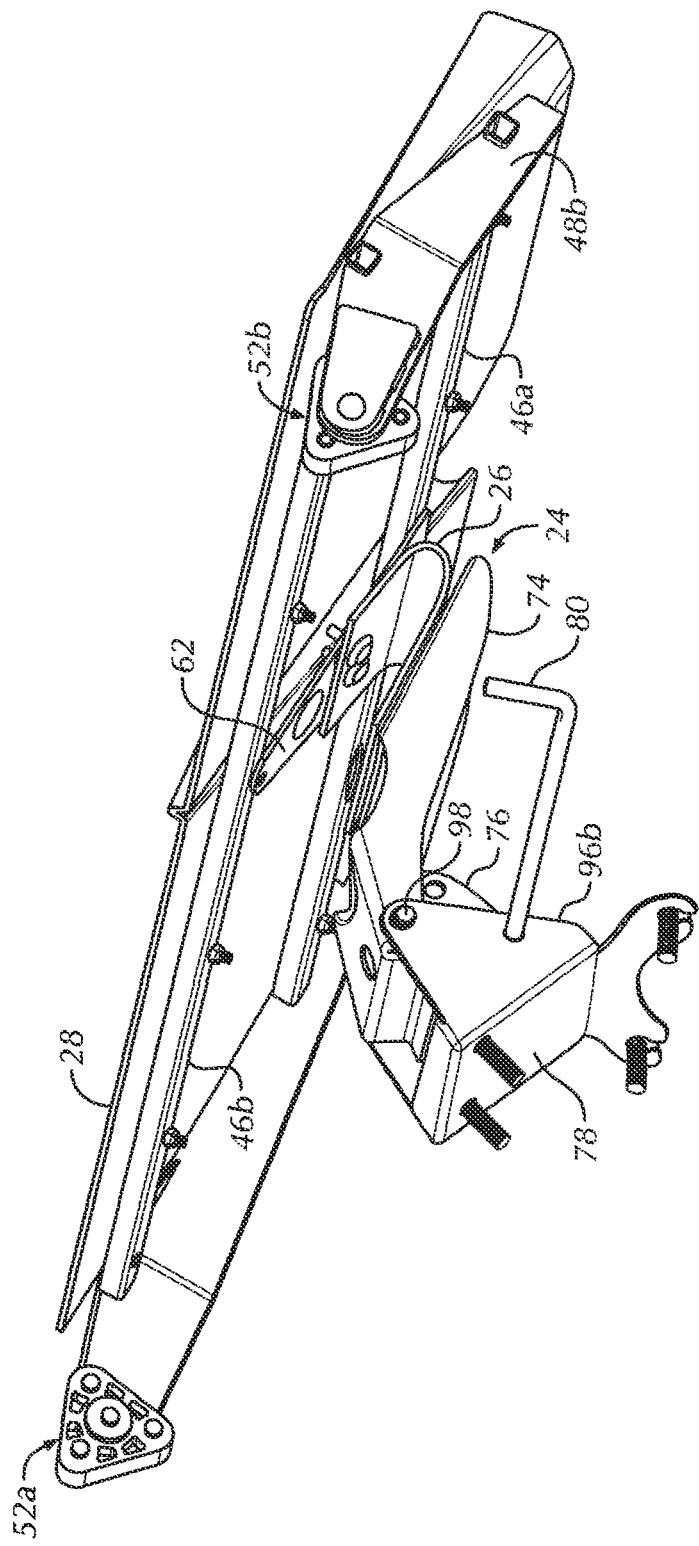
FIG. 7 is a front, bottom, perspective view of the foldable chaff pan assembly of FIG. 2.
Figure 8:
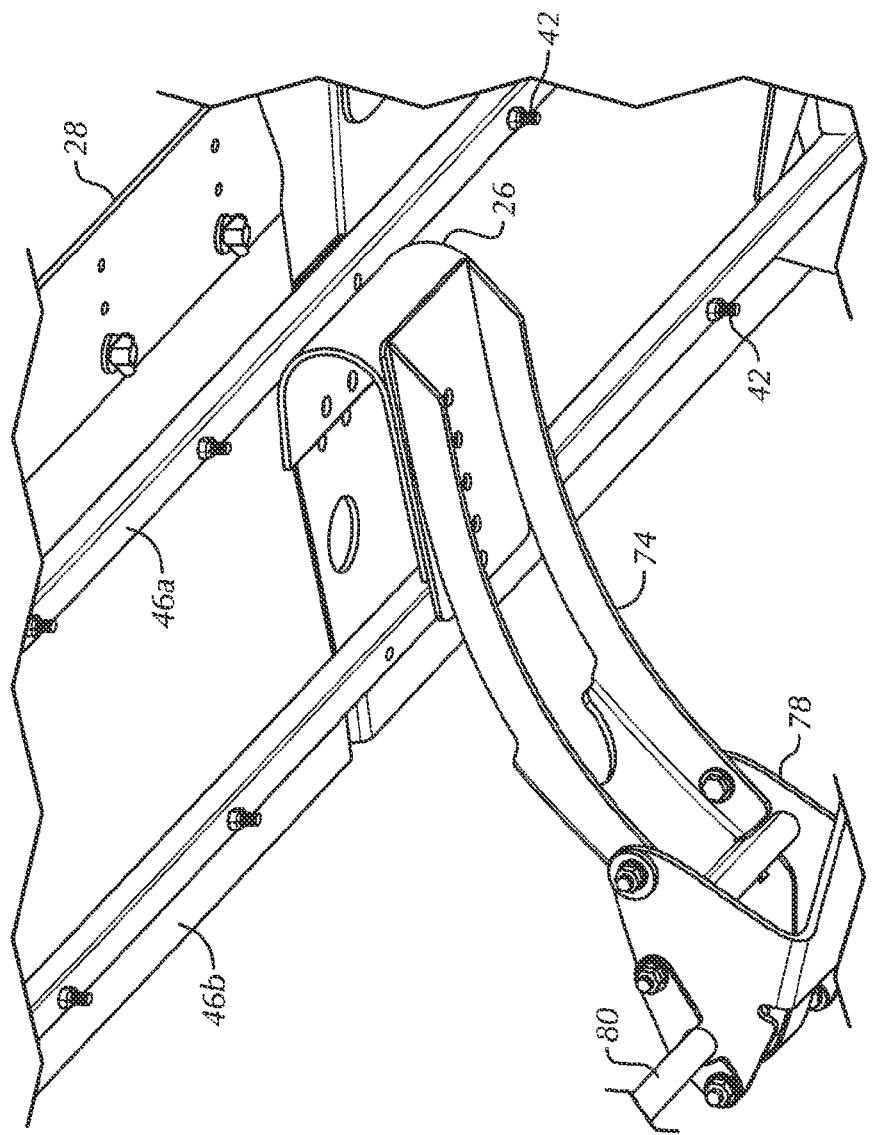
FIG. 8 is an enlarged, rear, bottom perspective view of the foldable chaff pan assembly of FIG. 2.

Each of the frame ends 48a, 48b is connected to a pivoting assembly 32 that includes pivoting element 52a, 52b, such as bushings 52a, 52b. Each bushings 52a, 52b is connected to their respective frame ends 48a, 48b by a bolt 55 and nut 58 configuration and an optional bushing plate 60 between the bushing 52a, 52b and frame end 48a, 48b. The bushings 52a, 52b allow the pan assembly 22 to pivot between a raised first position adjacent the cleaning apparatus 16 (i.e., an oscillating element) and an angularly related second position beneath the first position (see FIG. 5.) FIG. 4 illustrates the pan assembly 22 in an assembled state. Each of the bushings 52a, 52b are connected to a flat plate (not shown) of the cleaning apparatus 16 via bolt holes 53a, 53b in each of the bushings 52a, 52b, thereby allowing for a bolted connection of the bushings 52a, 52b to the flat plate.

Figure 6:
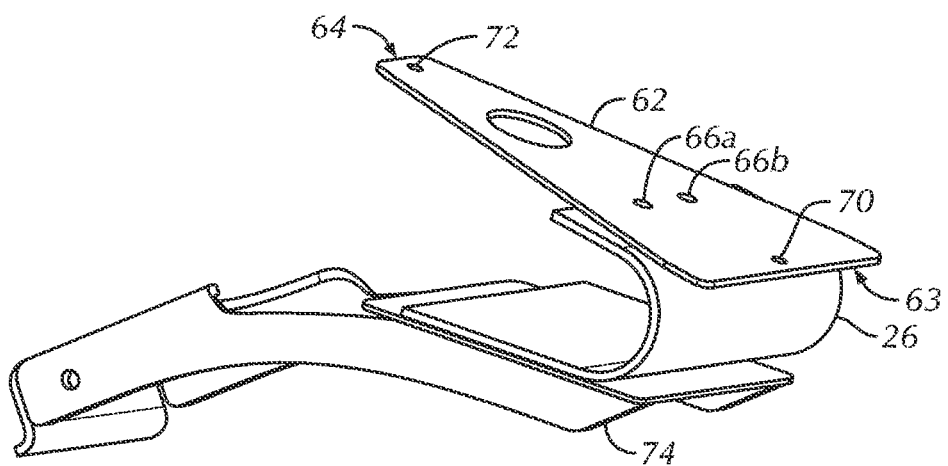
FIG. 6 is a rear, perspective view of a resilient member attached to a chaff pan bracket and a support member in accordance with the embodiment of FIG. 2.

The pan assembly 22 also includes a chaff pan bracket 62, as shown in FIGS. 2, 3 and 6. The chaff pan bracket 62 is preferably configured as best shown in FIG. 6. That is, the chaff pan bracket 62 is preferably configured as a planar isosceles trapezoid with a rear end 63 larger than its front end 64. The chaff pan bracket 62 is configured with at least two openings 66a, 66b for receiving a fastener 68 (FIG. 2), such as, but not limited to a nut and bolt fastener, that fastens the resilient member 26 thereto. The chaff pan bracket 62 also preferably includes an opening 70 about rear end 64 and an opening 72 about front end 64 for receiving fasteners 70a and 72a (FIG. 2), respectively.

The support assembly 24 is configured as best shown in FIGS. 2-7 and includes a support member 74 having a pivot joint 76, a mounting bracket 78, and a locking pin 80. The support member 74 includes an upper portion 82 having a planar surface 84 and a thru hole 86 extending through the planar surface 84 about a mid-portion of the support member 74. The first end 110 of the resilient member 26 is connected to the upper portion 82 by a fastener 88, such as a nut and bolt fastener and the like. The thru hole 86 receives the fastener 88 for connecting the resilient member 26 to the planar surface 84 of the upper portion 82.

The pivot joint 76 is a vertically planar extension that extends inferiorly to the upper portion 82. The pivot joint 76 includes at least two thru holes 90a, 90b and preferably three thru holes 90a-c, that traverse the pivot joint 76 in the horizontal direction. The dim holes 90a-c are configured along the pivot joint 76 so as to be angularly spaced apart from each other. Thru hole 90a is configured to correspond to a first position in which the pan assembly 22 is in the fully upright configuration. Thru hole 90b is preferably spaced apart from thru hole 90a about 15-25 degrees in the posterior and superior direction to support the pan assembly 22 in an angular position relative to the first position. Thru hole 90c is preferably spaced apart from thru hole 90a about 60-85 degrees in the posterior and superior direction to support the pan assembly 22 in another angular position relative to the first position. Thru holes 90b, 90c correspond to a second position angularly related to the first position in which the support member 24 supports the pan assembly 22 in an inferior position relative to the first position.

The pivot joint 76 also includes a central thru hole 92. The central thru hole 92 corresponds to a central axis A about which the support member 24 pivots about, as further discussed below.

The mounting bracket 78 includes a base portion 94 and lateral vertically extending side portions 96a, 96b. The laterally vertically extending side portions 96a, 96b each includes a central thru hole 92a, 92b, respectively. The central thru holes 92a, 92b correspond with and align with central thru hole 92 of the pivot joint 76. The support member 74 is pivotably connected to the mounting bracket 78 by a pin and bushing connector 98 that extends through central thru holes 92, 92a and 92b of the pivot joint 76 and mounting bracket 78 and allows for the pivotable movement of the support member 74 about axis A.

The mounting bracket 78 also includes a medial portion 100 that generally extends rearwardly and includes a thru hole 102. Thru hole 102 is configured to individually align with each thru hole 90a-c when the support member 74 is connected to the mounting bracket 78, such that a locking pin 80 can extend therethrough, locking the support member 74 in an angular position corresponding to the respective position of each thru hole 90a-c. The mounting bracket 78 is also configured to mount to the rear end of the combine 12 by various fasteners, welds, and the like.

The resilient member 26 comprises a reinforced polyester/nylon composite. Preferably, the resilient member 26 consists essentially of reinforced polyester and nylon. An exemplary resilient member can be baler belting, such as Original Round Baler Belting from Prairie Belting, Inc. of Wichita, Kans. The baler belting can be a three ply construction of a center ply having a first synthetic fabric, first and second outer plies, a first rubber skim interposed between the center ply and first outer ply, a second rubber skim interposed between center ply and second outer ply, and first and second rubber covers bonded to the first and second outer plies. Such baler belting materials is disclosed in U.S. Pat. No. 4,371,580, the disclosure of which is incorporated by reference herein in its entirety.

The resilient member 26 is pliable such that the resilient member 26 can bend freely and repeatedly without breaking. The resilient member 26 comprises a modulus sufficient to support the weight of the pan assembly 22 in a spaced apart relation to the support assembly 24. That is, for example, when a pliable resilient member 26 of a generally rectangular configuration is configured so as to be folded upon itself thereby forming an arched configuration, the modulus of the pliable resilient member 26 is sufficient to support the pan assembly 22 while leaving a space, gap, or plenum between the ends of the pliable resilient member 26, as a result of the arched configuration, as shown in FIG. 2.

The reinforced polyester/nylon composite preferably includes a Shore A hardness of at least 68 and preferably about 68 to 78 and a modulus of at least 1.0% and preferably about 1.75+/−0.75% at 150 lb./in. width. The resilient member 26 is preferably configured as a planer belt-like member having a width of at least six inches and preferably about 6-8 inches, a length of at least eleven inches and preferably about 11 to 13 inches, and thickness of at least 0.25 inches and preferably about 0.25 to 1.0 inch. While reinforced polyester/nylon composite is preferred, any pliable resilient material sufficient for the intended use of the present embodiment, and more preferably any resilient material having a shore A hardness of about 68 to 78 and a modulus of about 1.75+/−0.75% can be used with the present embodiments of the instant invention.

Figure 9:
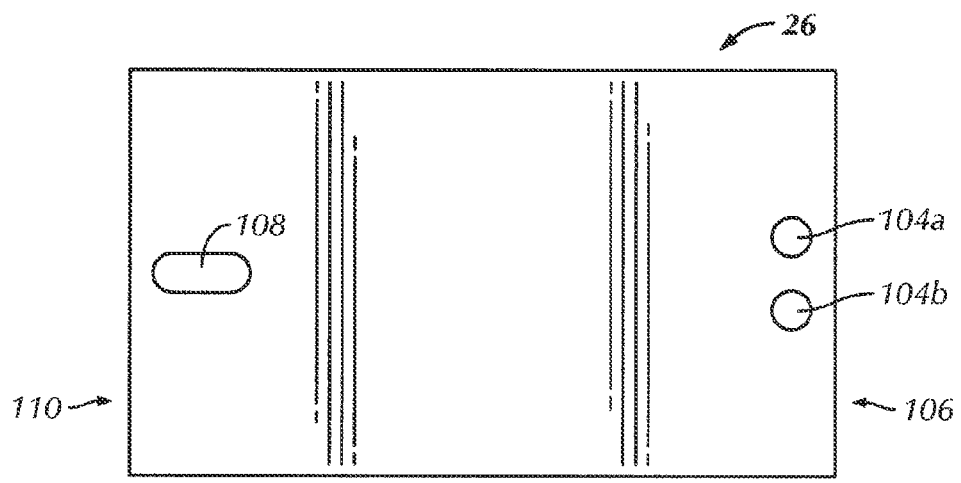
FIG. 9 is a plan view of the resilient member of FIG. 6 in an un assembled state.
Figure 9A:
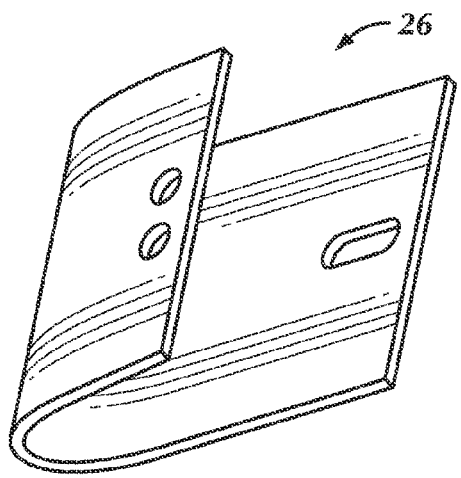
FIG. 9A is a perspective view of the resilient member of FIG. 9 in an arched shaped state.
Figure 9B:
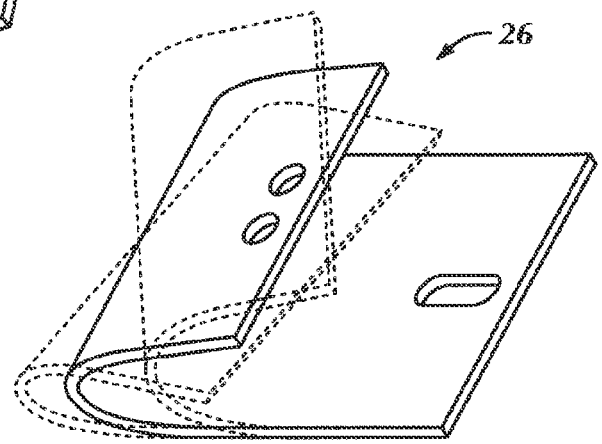
FIG. 9B is a perspective view of the resilient member of FIG. 9A in varying angular •, • and • positions.

Referring to FIGS. 9 and 9A, the resilient member 26 includes two thru holes 104a, 104b about its second end 106 for receiving fasteners 68 to connect the resilient member's second end 106 to a lower portion of the pan assembly 22. The resilient member 26 also includes a thru hole 108 about it first end 110 for connecting the first end 110 to the upper portion of the support assembly 24 by fastener 88. The resilient member 26 is preferably connected to the support assembly by a single fastener to advantageously allow for pivotable movement of the resilient member 26 about the fastener 88.

In the assembled state, the resilient member 26 is arched so as to be in a substantially "C" or "U" shaped configuration, as shown in FIG. 9A. The arched shape orientation of the resilient member advantageously allows for oscillating, tilting, and rotational movement of the pan assembly 22 relative to the support assembly 24 through a variety of angles in three dimensions. For example, the arched shaped resilient member 26 allows for variations and angular movement in pitch (angle •), roll (angle •) and yaw (angle •), as shown in FIGS. 2, 9B, 13 and 14.

Preferably, the first end 110 is connected to the support assembly 24 to form a first connection that is spaced apart from a second connection formed by the second end 106 connected to a lower portion of the pan assembly 22. The first and second connections are spaced apart in two dimensions, such as in the anterior posterior direction and the superior and inferior direction. Preferably, the second connection is configured posterior to the first connection.

The resilient member 26 can alternatively be comprised of two planar layers 26a, 26b, as shown in FIG. 2. The two planar layers 26a, 26b provide additional support for bearing the weight of the pan assembly 22 and for added flexibility to allow the resilient member 26 to more freely move in all six degrees of freedom as the pan assembly 22 moves relative to the stationary support assembly 24.

Figure 11:
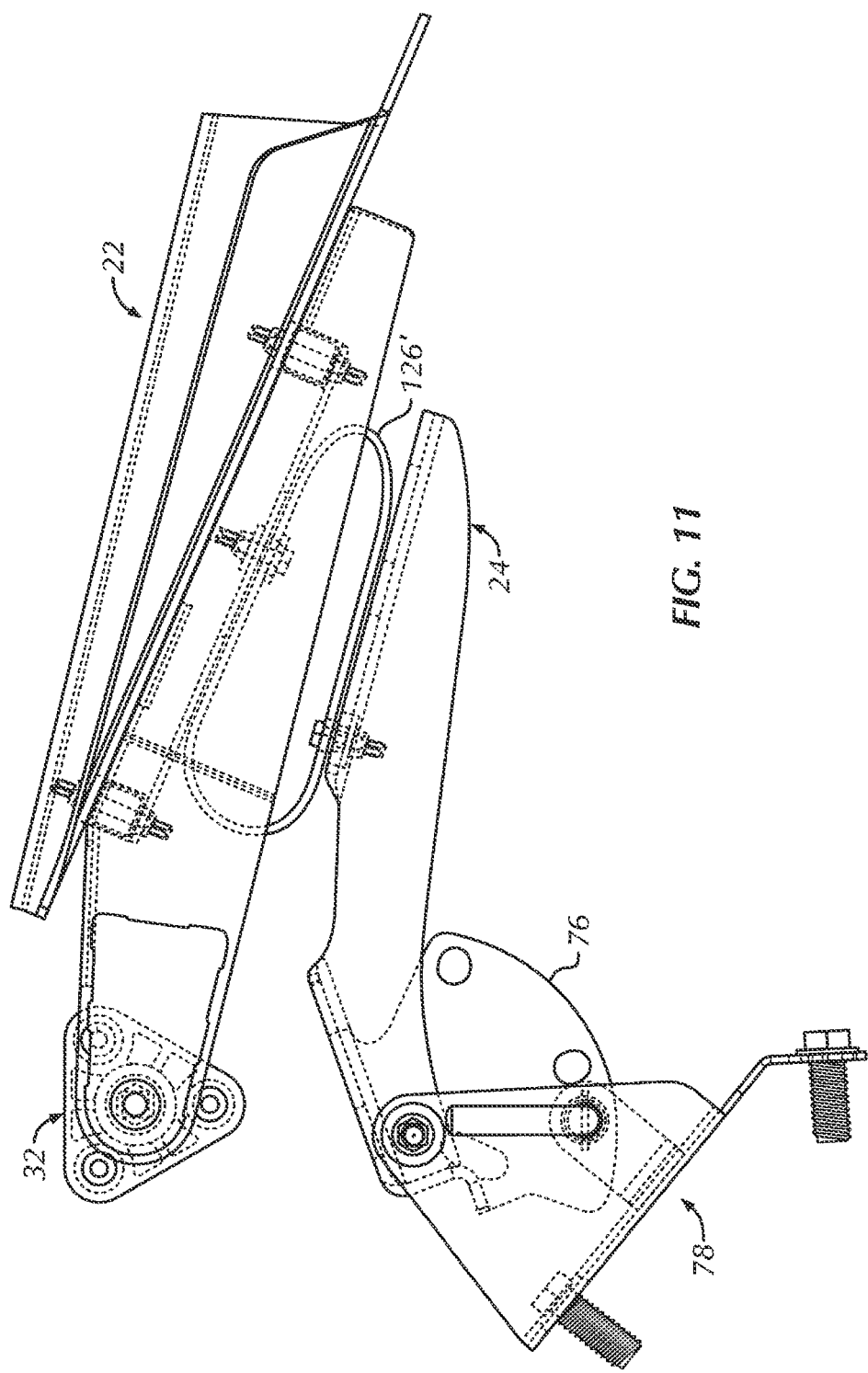
FIG. 11 is a side, elevational view of the foldable chaff pan assembly of FIG. 2 with another cylindrically shaped resilient member in accordance with yet another preferred embodiment of the present invention.
Figure 12:
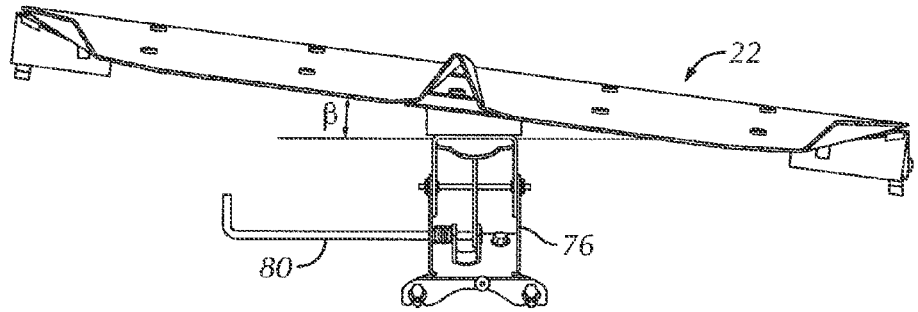
FIG. 12 is rear, elevational view of the foldable chaff pan assembly of FIG. 2 with the foldable chaff pan assembly at an angle • relative to the horizontal.
Figure 13:
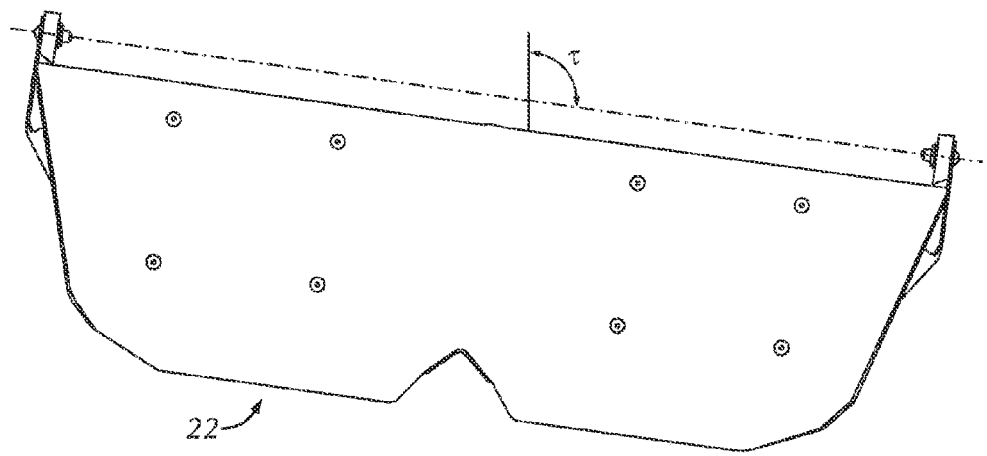
FIG. 13 is top, plan view of the foldable chaff pan assembly of FIG. 2 with the foldable chaff pan assembly at an angle • relative to a midline of the combine.

In another preferred embodiment, the resilient member 126 is configured substantially the same as that of resilient member 26, but with a generally cylindrical shape having an oval profile, as shown in FIG. 10, wherein a planar resilient member is overlappingly rolled upon itself to form a generally cylindrical shape. Alternatively, the resilient member 126• can be configured as a complete cylinder, as shown in FIG. 11. The cylindrical shape of the resilient member 126• is shown in a slightly compressed mode due to the weight of the pan assembly 22 supported by the resilient member 126•.

The resilient members 26, 126 can alternatively be comprised of a steel spring instead of a reinforced polyester/nylon composite. Such steel springs are well know in the art and a detailed description of them is not necessary for a complete understanding of the present invention. However, such applicable steel springs have a yield strength sufficient for the intended use to support a pan assembly 22.

In operation, the present invention provides for a pan assembly 22 supported by a support assembly 24 and a resilient member 26. However, unlike conventional foldable chaff pan assemblies, the present invention advantageously provides for a support design that is significantly less susceptible to wear than conventional pipe and roller support assemblies. Moreover, the present invention unexpectedly provided surprising results with respect to wear of the support system for chaff pan assemblies. That is, the present invention unexpectedly provided superior wear characteristics such that the oscillations of the chaff pan assembly did not wear out the bearing/sliding means of the chaff pan assembly i.e., the resilient member 26, after 1,500 hours on a wear simulator, as further described in Example I below.

Example I

Figure 1:
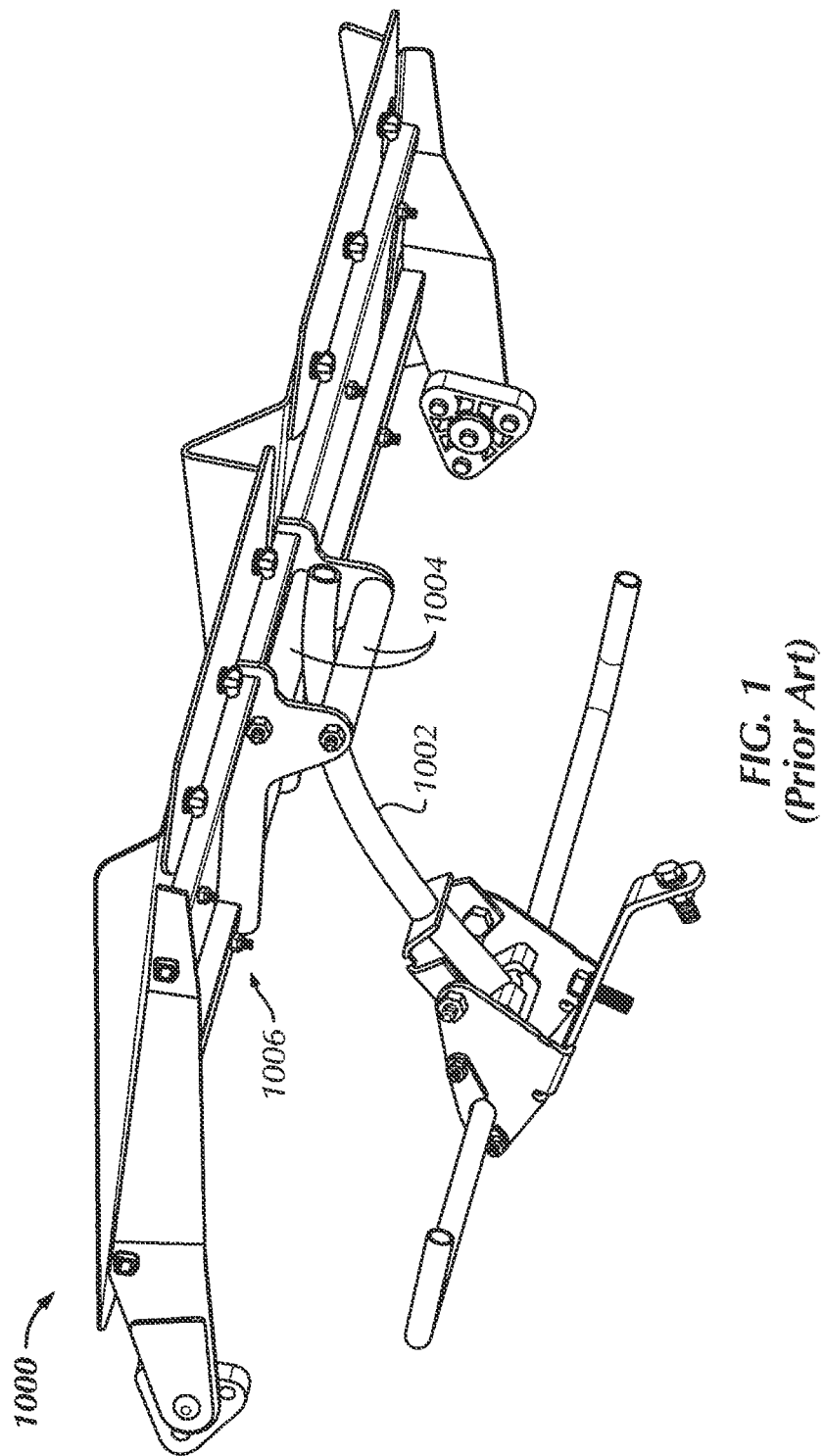
FIG. 1 is a bottom, rear, perspective view of a conventional chaff pan assembly of an agricultural combine.

A comparative wear analysis was conducted comparing a conventional pipe and roller bearing support system (as shown in FIG. 1) to a resilient member support system (as shown in FIG. 2). The wear simulator simulated oscillations identical to that of a conventional combine's cleaning system. The wear simulator was operated to oscillate at 272 RPMs.

After 60 hours on the wear simulator, the pipe and roller bearing support resulted in catastrophic or mission disabling wear of the pipe component (i.e., 1002 on FIG. 1). Catastrophic or mission disabling wear means that the component would have to be replaced in order for the chaff pan assembly to operate properly.

The same wear simulator was used to test the wear performance on the resilient member support system of the present invention. While some minor visual debris wear was detectable, after 1,500 hours on the wear simulator, testing was stopped because no catastrophic/mission disabling wear was detected.

One hour of life on the wear simulator is estimated to represent nine hours of actual field life. Thus, the pipe and roller bearing support would theoretically predict catastrophic wear of the pipe component after 60×9=540 hours of actual field use. Under real time conditions, an identical pipe and roller bearing support was evaluated and detected to have catastrophic wear after 550 hours of use.

The theoretical predicted life of the resilient member support system of the present invention is estimated to be exceed 1,500×9=13,500 hours. In the agricultural combine industry, components are designed to typically have a wear life of about 1,000 hours, after which such components would typically require replacement. Thus, as the resilient member support system of the present invention surpasses a predicted life of about 13,500 hours, the present invention surprising resulted in an estimated predicted life span that exceeds that of the agricultural combine itself.

Figure 14:
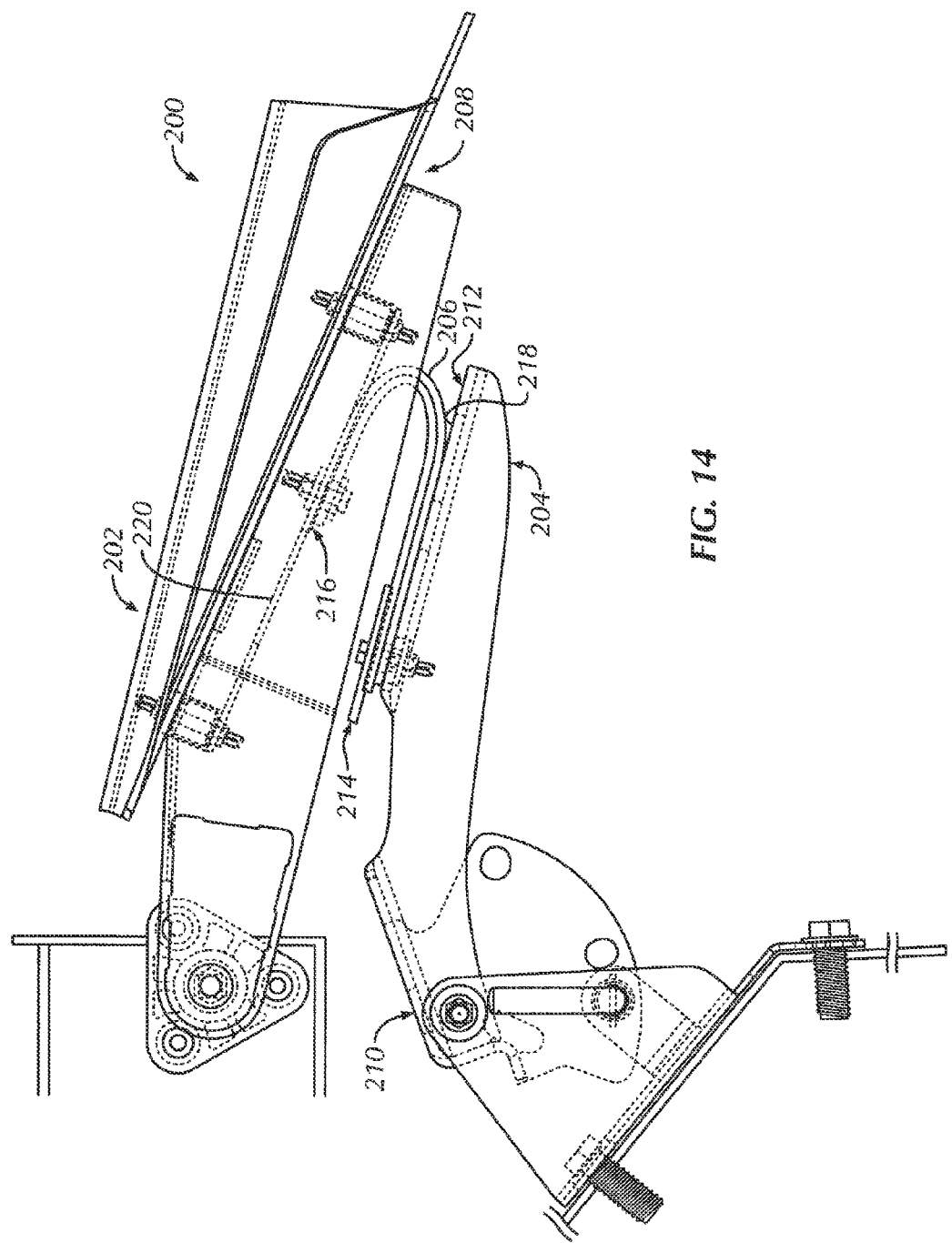
FIG. 14 is a side, elevational view of a support assembly for supporting a moveable member in accordance with another preferred embodiment of the present invention.

In accordance with another aspect, the present invention provides for a support assembly 200, as shown in FIG. 14. The support assembly 200 includes a moveable member 202, a support member 204 and a pliable resilient member 206. In general, the support assembly 200 is configured for supporting a moveable member of an agricultural combine.

The moveable member 202 is operatively connected to a combine for movement relative to the combine. Such movement can be oscillating movement, pivoting movement, or the like. In general, the moveable member can be any member that is capable of changing either of its pitch, yaw and roll positions. The moveable member 202 includes a lower portion 208. Exemplary moveable members applicable to the present embodiment include, but is not limited to a chaff pan, a foldable chaff pan, and a cleaning shoe.

The support member 204 is connected to the combine and preferably connected to the combine so as to be near the moveable member 202. The support member 204 is a stationary member that is rigidly fixed to the combine. Alternatively, the support member 204 can be pivotably connected to the combine to move between at least a first position and a second position. The first and second positions correspond to angular positions relative to the pivot of the pivotable connection 210 of the support member 204. Thus, the support member 204 can support the moveable member 202 in at least the first position and the second position. The support member 204 includes an upper portion 212.

The pliable resilient member 206 is substantially as described above for resilient member 26. The pliable resilient member 206 includes a first end 214 and a second end 216. The first end 214 is connected to the upper portion 212 of the support member 204 and preferably an upper surface 218 of the support member. The second end 216 is connected to the lower portion 208 of the moveable member 202 and preferably a lower surface 220 of the moveable member. The first and second ends 214, 216 are connectable similarly as described in the above embodiment. Preferably, the pliable resilient member 206 is connected to the support member 212 and moveable member 202 so as to form a space between the first and second ends 214, 216. An arched or cylindrical configuration for the pliable resilient member 206 when attached to the support and moveable member 212, 202 is preferred.

The pliable resilient member 206 is configured to allow movement of the moveable member 202 relative to the support member 212 in six degrees of freedom. The pliable resilient member 206 is also configured to support the moveable member 202 in a spaced apart relation to the support member 212, as shown in FIG. 14. This is accomplished by configuring the pliable resilient member 206 to have a modulus sufficient to support the weight of the moveable member 202. Preferably, the modulus of the pliable resilient member 206 is at least 1.0% at 150 lb./in. width.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An agricultural combine that includes a support assembly, the support assembly comprising:
   a pliable resilient member being sandwiched between a chaff pan assembly, and a support member that is associated with the chaff pan assembly, wherein the pliable resilient member facilitates motion of the support member in six degrees of freedom relative to the chaff pan assembly; the chaff pan assembly sits upon the pliable resilient member and
   a boundary that defines a hole as part of the pliable resilient member, the hole for receipt of a fastener that connects the pliable resilient member to one of the chaff assembly or the support member, wherein the pliable resilient member maintains a folded configuration between the support member and the chaff pan assembly.

2. The agricultural combine of claim 1, wherein the support member is pivotably connected to the agricultural combine to support the moveable member in at least a first position and a second position.

3. The agricultural combine of claim 1, wherein the fastener employs a nut and bolt arrangement.

4. The agricultural combine of claim 1, wherein the pliable resilient member comprises reinforced polyester and nylon.

5. The agricultural combine of claim 1, wherein the pliable resilient member consists essentially of reinforced polyester and nylon.

6. The agricultural combine of claim 1, wherein the pliable resilient member comprises a shore A hardness of at least 68.

7. The agricultural combine of claim 1, wherein the pliable resilient member comprises a modulus of at least 1.0% at 150 lb./in. width.

8. The agricultural combine of claim 1, wherein the pliable resilient member comprises a modulus sufficient to support a chaff pan in a spaced apart relation to the support member.

9. An agricultural combine having a support assembly for supporting a chaff pan, the combine comprising:
   the chaff pan attachable to the combine and moveable relative thereto, the chaff pan having a lower portion;
   a support member connected to the combine, the support member having an upper portion; and
   a cylindrical pliable resilient member having a first end connected to the upper portion of the support member and a second end connected to the lower portion of the chaff pan, such that the cylindrical pliable resilient member is sandwiched between the chaff pan and the support member; the chaff pan is installed upon the cylindrical pliable resilient member;
   the cylindrical pliable resilient member configured to allow movement of the chaff pan relative to the support member in six degrees of freedom and to support the chaff pan in a spaced apart relation to the support member, wherein the pliable resilient member maintains a folded configuration between the support member and the chaff pan.

10. The agricultural combine of claim 9, wherein the support member is pivotably connected to the combine to support the chaff pan in at least a first position and a second position.

11. The agricultural combine of claim 9, wherein the first end of the pliable resilient member is spaced apart from the second end to form a space therebetween.

12. The agricultural combine of claim 9, wherein the pliable resilient member comprises reinforced polyester and nylon.

13. An agricultural combine having a support assembly for supporting a chaff pan, the combine comprising:
   the chaff pan a operatively connected to the combine and moveable relative to the combine, the chaff pan having a lower portion;
   a support member connected to the combine, the support member having an upper portion; and
   a pliable resilient member having a first end connected to the upper portion of the support member and a second end connected to the lower portion of the chaff pan, such that the pliable resilient member is sandwiched between the chaff pan and the support member, wherein the pliable resilient member enables movement of the chaff pan relative to the support member in six degrees of freedom; the chaff pan sits on the pliant resilient member, wherein the pliable resilient member maintains a folded configuration between the support member and the chaff pan.

14. The agricultural combine of claim 13, wherein the support member is pivotably connected to the combine to support the chaff pan in at least a first position and a second position.

15. The agricultural combine of claim 13, wherein the first end of the pliable resilient member is spaced apart from the second end to form a space therebetween.

16. The agricultural combine of claim 13, wherein the pliable resilient member comprises reinforced polyester and nylon.

17. The agricultural combine of claim 13, wherein the pliable resilient member comprises a shore A hardness of at least 68 and a modulus of at least 1.0% at 150 lb./in. width.

* * * * *